(12) United States Patent
Jeon

(10) Patent No.: US 12,179,761 B2
(45) Date of Patent: Dec. 31, 2024

(54) VEHICLE AND METHOD OF CALIBRATING SURROUNDING IMAGE THEREFOR

(71) Applicants: HYUNDAI MOTOR COMPANY, Seoul (KR); KIA CORPORATION, Seoul (KR)

(72) Inventor: Young Seok Jeon, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 333 days.

(21) Appl. No.: 17/410,303

(22) Filed: Aug. 24, 2021

(65) Prior Publication Data

US 2022/0089156 A1  Mar. 24, 2022

(30) Foreign Application Priority Data

Sep. 18, 2020 (KR) .......................... 10-2020-0120543

(51) Int. Cl.
| | |
|---|---|
| *G06V 20/58* | (2022.01) |
| *B60W 30/12* | (2020.01) |
| *B60W 30/16* | (2020.01) |
| *G06V 20/56* | (2022.01) |

(52) U.S. Cl.
CPC .......... *B60W 30/162* (2013.01); *B60W 30/12* (2013.01); *G06V 20/58* (2022.01); *G06V 20/588* (2022.01); *B60W 2420/403* (2013.01); *B60W 2555/20* (2020.02)

(58) Field of Classification Search
CPC ........ G06V 10/24; G06V 10/16; G06V 10/98; G06V 10/80; B60W 2420/42; B60W 2050/0215; G06T 7/85; G06T 2207/20221; G06T 2207/20212
See application file for complete search history.

(56) References Cited

U.S. PATENT DOCUMENTS

| | | | |
|---|---|---|---|
| 2015/0222813 A1* | 8/2015 | Okude ............... | G01C 21/3602 701/523 |
| 2016/0234436 A1* | 8/2016 | Yu .............................. | G06T 5/50 |
| 2019/0135276 A1* | 5/2019 | Lee ........................ | B60W 10/20 |

FOREIGN PATENT DOCUMENTS

KR    10-2018-0052415 A    5/2018

* cited by examiner

*Primary Examiner* — Kenneth J Malkowski
(74) *Attorney, Agent, or Firm* — Morgan, Lewis & Bockius LLP

(57) ABSTRACT

A vehicular surrounding image calibration method may include determining whether driving lane and vehicle speed control functions are activated, upon determining that the driving lane and vehicle speed control functions are activated, determining a satisfied or dissatisfied state of each of a road condition and an external environmental condition based on a connected car service (CCS), and upon determining that the external environmental condition and the road condition are satisfied, performing automatic calibration of a surround view monitor (SVM) function.

14 Claims, 7 Drawing Sheets

FIG. 2

| ENVIRONMENT CLASSIFICATION | CONDITION ITEM | INFORMATION SOURCE | OPERATION CONTENT | REMARKS |
|---|---|---|---|---|
| DETERMINE OPERATION ENVIRONMENTAL CONDITIONS | | ADAS/AVN → SVM ECU | WHEN CONNECTED CAR INFORMATION CONDITIONS ARE SATISFIED DURING OPERATION OF LFA/SCC SYSTEMS, TRANSMIT CALIBRATION IMPLEMENTATION SIGNAL TO SVM ECU WHILE MAINTAINING STATE OF DIRECTLY CONTROLLING DRIVING LANE/VEHICLE SPEED | SUPPORT 0 TO 200 KM/H USING FRONT CAMERA THROUGH LANE FOLLOWING ASSIST (LFA) FUNCTION (SUPPORT 60 TO 200 KM/H THROUGH LKA FUNCTION) LIMIT VEHICLE SPEED THROUGH SMART CRUISE CONTROL (SCC) FUNCTION |
| LUMINANCE | SUNRISE /SUNSET | CONNECTED CAR SERVICE SERVER (NAVIGATION) | IMPLEMENT CALIBRATION WHEN IT IS DAYTIME BETWEEN SUNRISE AND SUNSET AT CURRENT LOCATION | UTILIZE NAVIGATION SUNRISE/SUNSET INFORMATION WHEN CONNECTED CAR SERVICE IS NOT PROVIDED |
| WEATHER | RAINFALL /SNOWFALL | CONNECTED CAR SERVICE SERVER | IMPLEMENT CALIBRATION WHEN THERE IS NO RAINFALL/SNOWFALL AT CURRENT LOCATION | OMIT DETERMINATION OF WEATHER CONDITION WHEN CONNECTED CAR SERVICE IS NOT PROVIDED |
| ROAD ATTRIBUTE | ROAD GRADE | NAVIGATION | IMPLEMENT CALIBRATION ONLY WHEN GRADE OF ROAD CORRESPONDING TO CURRENT LOCATION IS MAJOR ROAD GRADE | |
| DRIVING | SPEED | NAVIGATION | IMPLEMENT TOLERANCE COMPENSATION ONLY WHEN CURRENT VEHICLE SPEED RANGES FROM 1 TO 50 (70) KM/H | IMPLEMENTATION IS IMPOSSIBLE DUE TO HIGH AVERAGE SPEED IN HIGHWAY/ URBAN FREEWAY AND DUE TO ABSENCE OF LANE AND UNPAVED STATE IN OTHER ROADS |
| SYSTEM (INTEGRATED CONTROLLER) | LOAD RATE | CPU/GPU/VPU IN CONTROLLER | IMPLEMENT TOLERANCE COMPENSATION ONLY WHEN OVERALL OCCUPANCY RATE OF CPU/GPU/VPU IS LESS THAN OR EQUAL TO 60% | EFFECT IS ENHANCED WHEN SVM ECU IS INTEGRATED WITH AVN/ADAS ECU |
| TRANSMIT VEHICLE TOLERANCE COMPENSATION RESULT | | SVM ECU →AVN → CONNECTED CAR SERVICE SERVER | TRANSMIT RELATED INFORMATION TO SERVER WHEN CALIBRATION HAVING HIGHER QUALITY THAN PREVIOUS CALIBRATION IS COMPLETED | VEHICLE INFORMATION, CALIBRATION LOCATION, CURRENT CALIBRATION QUALITY (CCQ), ETC. |
| UTILIZE SERVER TOLERANCE COMPENSATION RESULT | | CONNECTED CAR SERVICE SERVER →AVN →SVM ECU | UTILIZE CALIBRATION VALUE STORED IN SERVER WHEN VEHICLE IS NOT CAPABLE OF IMPLEMENTING CALIBRATION | MANAGE CALIBRATION VALUE FOR EACH VEHICLE/VEHICLE MODEL IN FORM OF DB, STORE PREDETERMINED NUMBER OF CALIBRATION VALUES GREATER THAN CCQ |

VEHICLE AND METHOD OF CALIBRATING SURROUNDING IMAGE THEREFOR

The present application claims priority to Korean Patent Application No. 10-2020-0120543, filed on Sep. 18, 2020, the entire contents of which is incorporated herein for all purposes by this reference.

BACKGROUND OF THE INVENTION

Field of the Invention

The present invention relates to a vehicle configured for realizing more effective and highly reliable calibration of a surrounding image and to a method of calibrating a surrounding image therefor.

Description of Related Art

In many cases, recently developed vehicles are provided with a plurality of cameras (e.g., a total of four cameras including front/rear/left/right cameras), which are mounted such that the fields of view thereof partially overlap each other, exhibiting a surround view monitor (SVM) function in which images captured by the respective cameras are synthesized to generate a top-view image, which displays the vicinity of a vehicle from a viewpoint above the vehicle.

However, to provide such an SVM function, it is necessary to compensate for tolerance due to a change in the position or field of view of a camera, which may be caused by assembly tolerance of a vehicle or vibration or impact while driving of the vehicle. Of course, in a process of manufacturing a vehicle, calibration for obtaining a unified top-view image is possible through an image synthesis algorithm on the floor on which a previously prepared pattern is drawn. However, when the position or the field of view of a camera changes while driving of a vehicle, calibration needs to be performed while driving.

However, calibration while driving may be performed only when all of multiple strict conditions (e.g., vehicle speed, steering angle, luminance, driving time, etc.) are satisfied. Therefore, it is necessary to determine whether the conditions are satisfied before performing calibration. However, when the determination as to whether the conditions are satisfied is constantly performed, the load on a controller for performing calibration increases (e.g., by 17.5%, depending on the controller).

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and a method of calibrating a surrounding image therefore that substantially obviate one or more problems due to limitations and disadvantages of the related art.

Various aspects of the present invention are directed to providing a vehicle configured for realizing calibration for more efficient provision of a surrounding image of the vehicle and a method of calibrating a surrounding image therefor.

Various aspects of the present invention are directed to providing a vehicle configured for more effectively determining or satisfying calibration-performing conditions and a method of calibrating a surrounding image therefor.

However, the objects to be accomplished by the exemplary embodiments are not limited to the above-mentioned objects, and other objects not mentioned herein will be clearly understood by those skilled in the art from the following description.

To accomplish the above and other objects, a vehicular surrounding image calibration method according to various exemplary embodiments of the present invention may include determining whether driving lane and vehicle speed control functions are activated, upon determining that the driving lane and vehicle speed control functions are activated, determining a satisfied or dissatisfied state of each of a road condition and an external environmental condition based on a connected car service (CCS), and upon determining that the external environmental condition and the road condition are satisfied, performing automatic calibration of a surround view monitor (SVM) function.

Furthermore, a vehicle according to various exemplary embodiments of the present invention may include a first controller configured to provide driving lane and vehicle speed control functions, a second controller configured to provide a communication function for a connected car service (CCS) and a navigation function, and a third controller electrically connected to the first controller and the second controller and configured to, upon determining that the driving lane and vehicle speed control functions are activated, determine whether each of a road condition and an external environmental condition is satisfied based on the connected car service (CCS), and upon determining that the external environmental condition and the road condition are satisfied, perform automatic calibration of a surround view monitor (SVM) function.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing the concept of an automatic calibration process according to various exemplary embodiments of the present invention;

Figure 1:
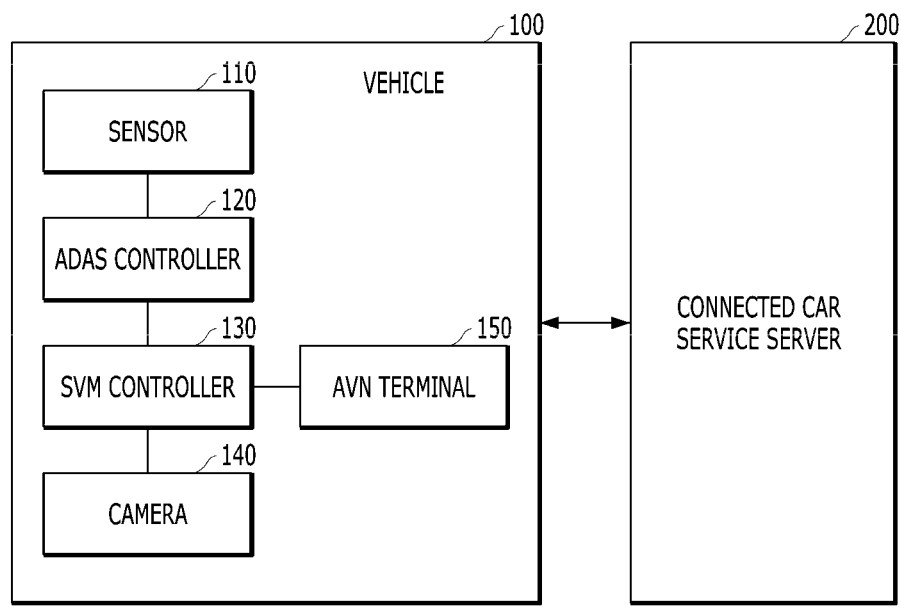
FIG. 1 illustrates an example of the configuration of a vehicular image calibration system including a vehicle according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings so that those skilled in the art may easily carry out the embodiments. The present invention may, however, be embodied in many different forms, and may not be construed as being limited to the embodiments set forth herein. In the drawings, parts irrelevant to the description of the present invention will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

FIG. 1 illustrates an example of the configuration of a vehicular image calibration system including a vehicle according to various exemplary embodiments of the present invention.

Referring to FIG. 1, a vehicular image calibration system according to various exemplary embodiments of the present invention may include a vehicle 100 and a connected car service (CCS) server (hereinafter referred to as a "CCS server" for convenience) 200, which is configured for exchanging data with the vehicle 100.

The vehicle 100 may include a sensor 110, an advanced driver assistance system (ADAS) controller 120 (hereinafter referred to as an "ADAS controller" for convenience), a surround view monitor (SVM) controller 130 (hereinafter referred to as an "SVM controller" for convenience), a plurality of cameras 140, and an audio/video/navigation (AVN) terminal 150. The above components of the vehicle 100 illustrated in FIG. 1 are main components associated with embodiments of the present invention, so an actual vehicle may include a greater or smaller number of components than those illustrated in FIG. 1.

Hereinafter, the components of the vehicle 100 will be described in more detail.

The sensor 110 may acquire information required for the ADAS controller 120 to perform at least functions of keeping in a driving lane and maintaining a constant speed range to provide an environment suitable for performing automatic calibration of the SVM function. To the present end, the sensor 110 may include a vision sensor, a RaDAR sensor, and a Light Detection and Ranging (LiDAR) sensor, but the exemplary embodiments are not limited thereto. The exemplary embodiments are not limited to any specific type of sensor, when the sensor is configured for acquiring information (e.g., recognition of a driving lane, recognition of an orientation relative to a neighboring vehicle, and recognition of a distance to a neighboring vehicle) required to perform the above functions.

The ADAS controller 120 may control a steering system and a powertrain based on the information acquired by the sensor 110 to maintain a constant vehicle speed while keeping in a driving lane and avoiding a collision with a neighboring vehicle. For example, lane keeping may be implemented by a lane following assist (LFA) function or a lane keeping assist (LKA) function, and maintenance of vehicle speed may be implemented by a smart cruise control (SCC) function. Here, the LFA function and the LKA function are similar to each other, but are different in that the LFA function is implemented in the speed range of 0 to 200 kilometers per hour (kph), and the LKA function is generally implemented in the speed range of 60 to 200 kilometers per hour (kph), which is narrower than the speed range within which the LFA function is implemented. However, the speed ranges within which the LFA function and the LKA function are implemented are not limited thereto.

The SVM controller 130 may synthesize images acquired from the plurality of cameras 140 to provide a top-view image, and may perform a surrounding image calibration function (SVM calibration function), which will be described later.

The cameras 140 are disposed to capture surrounding images of the vehicle 100 in forward, backward, leftward, and rightward directions. In the instant case, at least a portion of the field of view of each camera preferably overlaps the field of view of a camera adjacent thereto.

The AVN terminal 150 may perform a multimedia playback function and a navigation function, and may include a display for displaying route information, a list or playback state of multimedia contents, or a menu for setting the operational state of the vehicle. In addition, the AVN terminal 12 may be provided with a wireless communication module to exchange data with the CCS server 200. Although the AVN terminal 150 is referred to as a terminal because it has a communication function, a command input function, and an information output function, it may be regarded as a type of controller.

Although the SVM controller 130 is illustrated in FIG. 1 as being provided independently of the ADAS controller 120 and the AVN terminal 150, this is merely provided by way of example. The SVM controller 130 may be implemented in a form of being integrated with the ADAS controller 120 and/or the AVN terminal 150 (i.e., an integrated controller).

Hereinafter, a surrounding image calibration process according to an exemplary embodiment will be described in detail based on the vehicle configured as described above.

According to various exemplary embodiments of the present invention, the driving state suitable for calibration of a surrounding image is maintained through the ADAS function so that the conditions facilitating calibration of a surrounding image (SVM) are satisfied, and information on external conditions (e.g., a weather condition and a road condition) is acquired based on the connected car service (CCS) to determine whether to calibrate a surrounding image.

FIG. 2 is a table showing the concept of an automatic calibration process according to various exemplary embodiments of the present invention.

Referring to FIG. 2, when the calibration conditions are satisfied in the state in which the LFA and SCC functions are performed, the ADAS controller 120 may notify the SVM controller 130 of a signal indicating that the driving state suitable for calibration is maintained.

The information acquired based on the CCS includes luminance information and weather information. The luminance information is information pertaining to whether it is daytime, in which the characteristics of the road are sufficiently recognized from the images captured by the cameras 140 at the current location, and the weather information is information pertaining to whether there is no rainfall/snowfall. In the state in which the vehicle 100 is not subscribed to the CCS and thus is not configured for receiving the service, the above conditions may not be considered.

The information acquired through the navigation system by the AVN terminal 150 may include road attributes and a vehicle speed. When the road attributes include a road grade (e.g., grade 1, grade 2, or grade 3) indicating a major road, other than a highway or an urban freeway in which high-speed driving is expected, the calibration conditions may be satisfied, and when the vehicle speed ranges from 1 to 50 (or 70) kilometers per hour (kph), the calibration conditions may be satisfied. However, the exemplary embodiments are not limited thereto. Although the road grade condition is satisfied, if there is a construction section in driving road links, the calibration conditions may not be satisfied. The reason for this is that the construction section may be unpaved, or that there may be no lanes in the construction section.

On the other hand, when the SVM controller 130 is implemented as an integrated controller, which is integrated with the ADAS controller 120 or the AVN terminal 150, a system load rate may be further considered. For example, when the load rate of the processor (CPU, GPU, or APU) is less than or equal to 60%, the calibration conditions may be determined to be satisfied.

When the SVM calibration is successfully performed by the SVM controller 130, the result of calibration (i.e., a calibration value) may be transmitted to the CCS server 200 via the AVN terminal 150. Here, successful calibration may be the case in which current calibration quality (CCQ), which indicates the quality of the result of calibration, is higher than previous calibration quality. In the instant case, information on the vehicle (vehicle type, production year, option, etc.) and information on the location at which the calibration is performed may be transmitted together with the result of calibration.

The CCS server 200 may manage calibration results transmitted from the vehicle 100 in a database (DB). When the driving environment of the vehicle 100 does not satisfy the above-described calibration conditions, the CCS server 200 may provide the stored calibration value to the vehicle 100.

Figure 3:
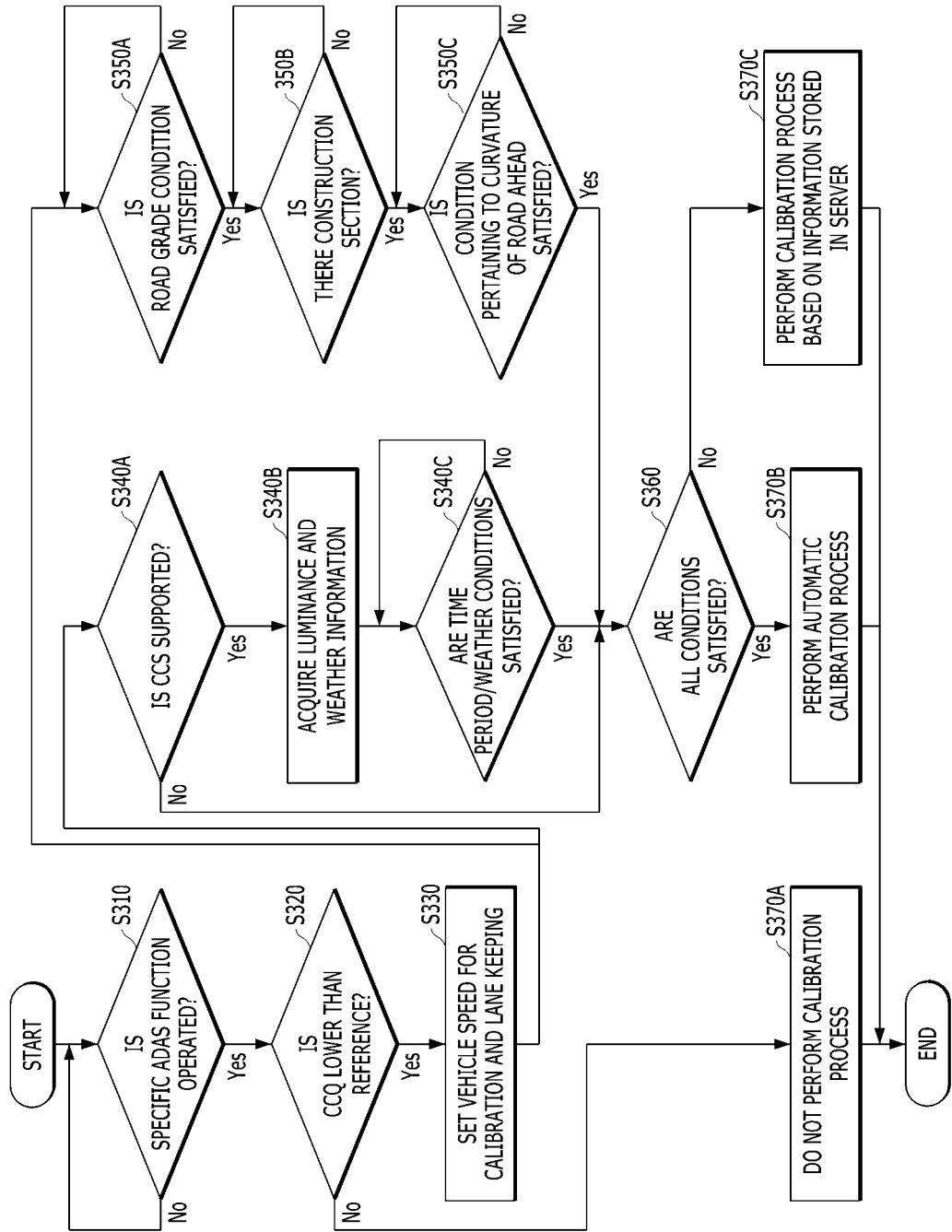
FIG. 3 is a flowchart illustrating an example of a surrounding image calibration process according to various exemplary embodiments of the present invention.

FIG. 3 is a flowchart illustrating an example of a surrounding image calibration process according to various exemplary embodiments of the present invention.

Referring to FIG. 3, when a specific ADAS function is operated (Yes in S310), the SVM controller 130 determines whether the quality of the calibration value (CCQ) applied to the current SVM is lower than a reference quality (S320).

Here, the operation of a specific ADAS function may mean simultaneous operation of a vehicle speed control function (e.g., SCC) and a lane keeping function (e.g., LFA or LKA). Furthermore, when the CCQ value is less than 80, the CCQ may be determined to be lower than the reference quality. However, the exemplary embodiments are not limited thereto.

When the CCQ satisfies the reference (No in S320), it means that the SVM quality is already good, so that the SVM calibration may be unnecessary, and thus may not be performed (S370A).

On the other hand, when the CCQ is lower than the reference (Yes in S320), the SVM controller 130 instructs the ADAS controller 120 to perform calibration, and accordingly, the ADAS controller 130 performs control for lane keeping and maintaining a vehicle speed range suitable for calibration (S330). When the lane maintenance and the vehicle speed maintenance start, the ADAS controller 120 may notify the SVM controller 130 of the present state. In various exemplary embodiments of the present invention, information indicating that the lane and vehicle speed keeping control is performed for SVM calibration may be output through a cluster or a display of the AVN terminal 150.

Thereafter, the SVM controller 130 determines whether the external conditions are satisfied. The external conditions may include external environmental conditions and road conditions. When these conditions are satisfied together, SVM calibration may be automatically performed. Also, the respective determinations of whether each condition is satisfied may be performed simultaneously.

The determination of the environmental conditions may be performed as follows.

When the vehicle supports the CCS (Yes in S340A), that is, when the AVN terminal 150 supports communication and processing applications required for the CCS and the vehicle is subscribed to the CCS, luminance and weather information may be acquired from the CCS server 200 (S340B). When the vehicle does not support the CCS (No in S340A), the determination of the environmental conditions may be omitted.

Upon determining that it is daytime and there is no rainfall/snowfall based on the luminance and weather information, the SVM controller 130 may determine that the environmental conditions are satisfied (Yes in S340C). When the environmental conditions are not satisfied (No in S340C), the SVM controller 130 may reconfirm the environmental conditions at a regular period, and may output guide information pertaining to the same.

The determination of the road conditions may be performed as follows.

The SVM controller 130 acquires, from the AVN terminal 150, information related to a road grade, information related to the presence or absence of a construction section, and information related to the curvature of a road ahead. The SVM controller 130 may determine that the road conditions are satisfied when the road grade corresponds to a predetermined grade (e.g., major road grades 1 to 3) (Yes in S350A), when there is no construction section in the driving road links (Yes in S350B), and when the curvature of the road ahead is maintained below a predetermined angle (e.g., 5 degrees) within a predetermined distance ahead (e.g., 1 km) (Yes in S350C). In various exemplary embodiments of the present invention, the, the determination as to whether the road conditions are satisfied may be performed by the AVN terminal 150, and only the result of the determination as to whether the road conditions are satisfied may be provided to the SVM controller 130.

When all of the external conditions are satisfied (Yes in S360), the SVM controller may perform an automatic calibration process according to a preset logic (S370B). The automatic calibration process will be described later with reference to FIG. 6 and FIG. 7.

On the other hand, when the state in which at least one of the environmental condition or the road condition is not satisfied is maintained for a predetermined amount of time or longer (No in S360), a calibration process may be performed based on the calibration value stored in the CCS server (S370C). The server-information-based calibration process will be described later with reference to FIG. 5.

Hereinafter, a process performed after the automatic calibration (S370B) will be described with reference to FIG. 4.

Figure 4:
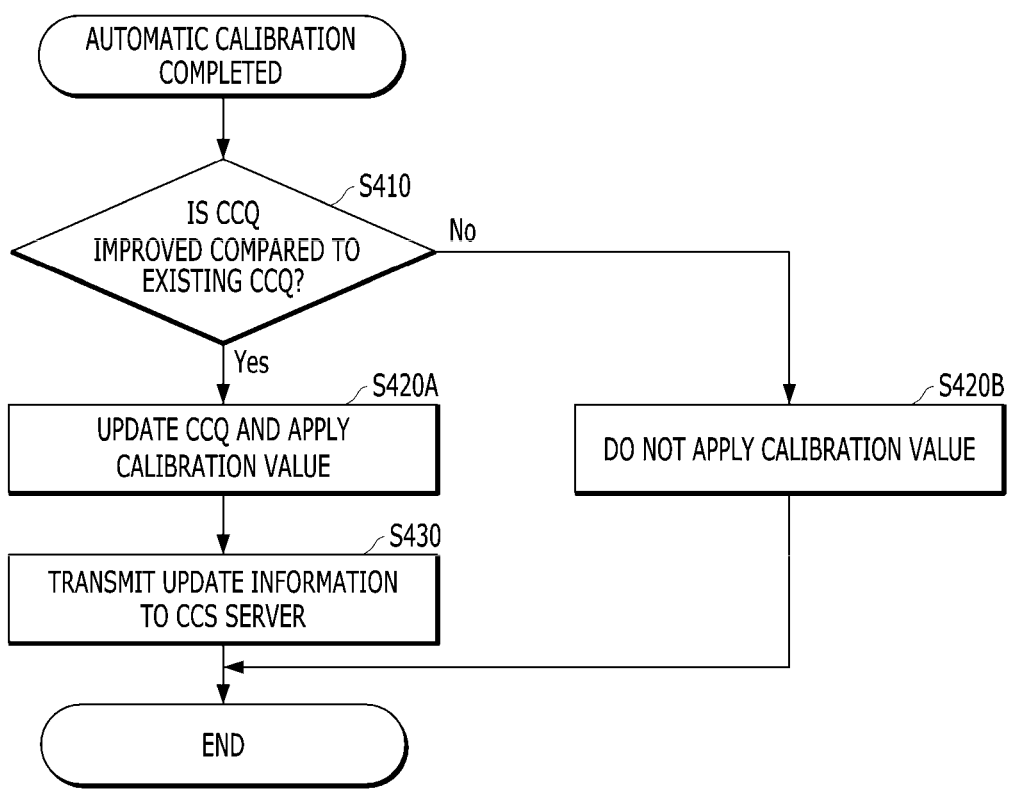
FIG. 4 is a flowchart illustrating an example of a process after automatic calibration is performed according to various exemplary embodiments of the present invention.

FIG. 4 is a flowchart illustrating an example of a procedure after the automatic calibration is performed according to various exemplary embodiments of the present invention.

Referring to FIG. 4, when the automatic calibration is completed, the SVM controller 130 may determine a CCQ value according to the automatic calibration, and may determine whether the determined CCQ value is increased above the existing CCQ value (i.e., the CCQ of the currently applied calibration value) (S410).

Upon determining that the determined CCQ value is increased (Yes in S410), the SVM controller 130 may update the CCQ information, and may apply the calibration value acquired through the automatic calibration to the SVM function (S420A). Furthermore, the SVM controller 130 may transmit the update information (i.e., the calibration value and the resultant CCQ value) to the CCS server 200 through the AVN terminal 150 (S430).

On the other hand, when determining that the determined CCQ value is not increased (No in S410), the SVM controller 130 does not apply the calibration value (S420B).

Figure 5:
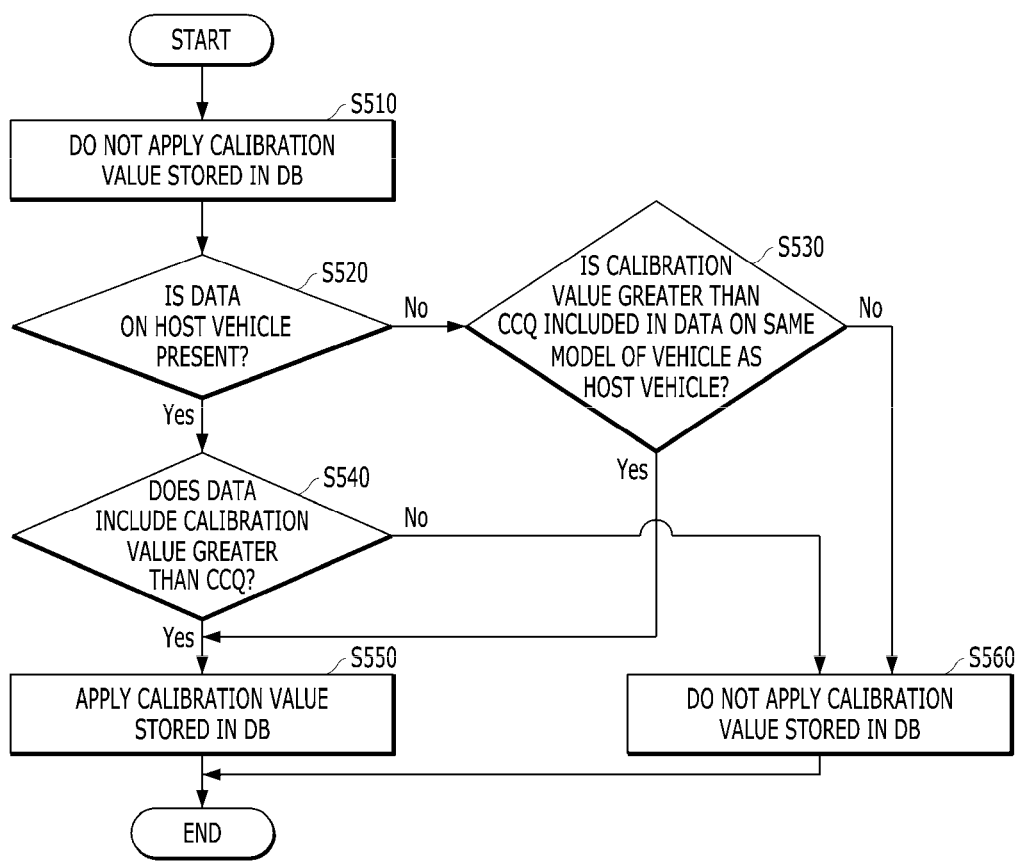
FIG. 5 is a flowchart illustrating an example of a server-based calibration process according to various exemplary embodiments of the present invention.

FIG. 5 is a flowchart illustrating an example of a server-based calibration process according to various exemplary embodiments of the present invention.

Referring to FIG. 5, upon the determination of the server-information-based calibration (S370C) (refer to FIG. 3), the AVN terminal 150 may access the CCS server 200 to query the SVM calibration value DB (S510).

As a result of the query, when there is data uploaded from the host vehicle at a previous time (Yes in S520) and when the data includes a calibration value greater than the CCQ (e.g., by 5% or more) (Yes in S540), the calibration value may be downloaded, and the SVM controller 130 may apply the downloaded calibration value (S550).

When there is no data on the host vehicle (No in S520), if a calibration value greater than the CCQ is present in data on the same model of vehicle as the host vehicle (Yes in S530), the calibration value may be applied (S550).

On the other hand, when the previous calibration value of the host vehicle is not greater than the CCQ (No in S540) or when there is no calibration value greater than the CCQ in the data on the same model of vehicle as the host vehicle (No in S530), the data stored in the DB is not applied (S560).

In FIG. 5, the comparison between the calibration value and the CCQ is performed based on whether the data including the calibration value pertains to the host vehicle or the same model of vehicle as the host vehicle. However, this is merely provided by way of example. Depending on how the DB is managed, an optimum calibration value may be acquired from the CCS server 200 according to a criterion such as a vehicle class, a trim level, options, or a current driving section.

Even when the automatic calibration through the above-described process is impossible, since the calibration value stored in the CCS server 200 may be used, it is possible to calibrate an SVM image in a limited situation.

Hereinafter, an automatic calibration process will be described with reference to FIG. 6 and FIG. 7.

Figure 6:
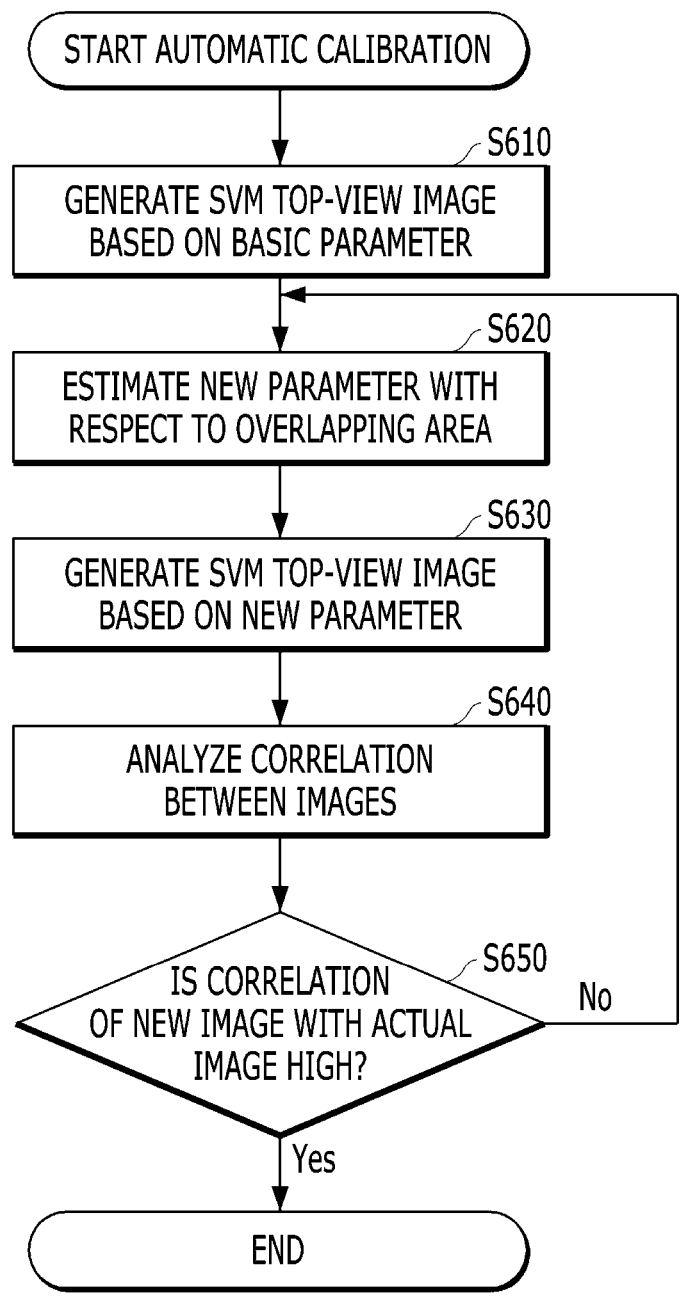
FIG. 6 is a flowchart illustrating an example of an automatic calibration process according to various exemplary embodiments of the present invention.

FIG. 6 is a flowchart illustrating an example of an automatic calibration process according to various exemplary embodiments of the present invention.

Referring to FIG. 6, with the determination of the automatic calibration (S370B) (refer to FIG. 3), the SVM controller 130 may generate an SVM top-view image based on a basic parameter (S610). Here, the basic parameter may be a currently applied calibration value, or may be a default calibration value.

A new parameter for calibrating SVM synthesis image matching may be estimated using pattern information of a top-view image of the surrounding road surface in frame units, obtained while driving for a predetermined amount of time (S620), and an SVM top-view image may be generated based on the present new parameter (S630).

The SVM controller 130 may measure a correlation using the existing parameter image and the new parameter image for forward, leftward, rightward, and backward overlapping areas in the SVM top view (S640). When the correlation of the new parameter image with the actual image is high (Yes in S650), the calibration value (parameter) may be updated, and the automatic calibration may be terminated. When the automatic calibration is completed, CCQ management for the corresponding calibration value may be performed.

On the other hand, when the correlation of the basic parameter image with the actual image is high (No in S650), the automatic calibration process may be performed again.

Figure 7:
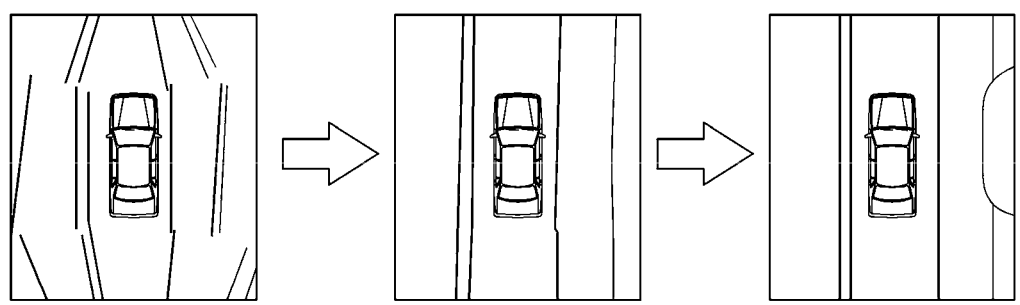
FIG. 7 shows an example of a top-view image obtained through an automatic calibration process according to various exemplary embodiments of the present invention.

FIG. 7 shows an example of a top-view image obtained through an automatic calibration process according to various exemplary embodiments of the present invention.

The drawing on the left in FIG. 7 shows an existing parameter image, the drawing in the center portion in FIG. 7 shows an image obtained in the middle portion of the automatic calibration process described above with reference to FIG. 6, and the drawing on the right in FIG. 7 shows an SVM image obtained upon completion of the automatic calibration process.

The SVM calibration method according to the exemplary embodiments described so far may be utilized as follows.

The number of automatic SVM calibrations may be managed in a form of a DB for each customer, and the DB may be utilized when informing the customer of the current SVM calibration state or when servicing a vehicle in a response to a customer complaint. Furthermore, the number of automatic SVM calibrations and the current SVM calibration state may be provided to each corresponding customer through the display of the AVN terminal 150 or a smartphone application, increasing customer satisfaction. Furthermore, when an individual vehicle customer is dissatisfied with the SVM calibration state, a customer service center is configured for immediately checking the current calibration state through the connected car service server, effectively performing a consultation service with the customer before the customer takes his or her vehicle to a service center and facilitating efficient maintenance of the vehicle.

Meanwhile, when the vehicle enters an environment in which the conditions for implementing automatic SVM calibration are good (e.g., a section at which it is determined that a high CCQ value is generated while driving), implementation of SVM calibration may be recommended to a driver. At the instant time, conditions for implementing tolerance compensation, such as LFA/SCC, may also be provided to the driver. In the instant case, it is possible to induce implementation of higher-quality tolerance compensation.

Furthermore, vehicle manufacturers do not need to add new equipment, so there is little concern about an increase in costs due to implementation of SVM calibration.

The present invention may be implemented as code which may be written on a computer-readable recording medium and thus read by a computer system. The computer-readable recording medium includes all kinds of recording devices in which data which may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, the vehicle according to at least various exemplary embodiments of the present invention configured as described above is configured for more effectively calibrating a surrounding image while driving.

It is possible to maintain a good calibration environment while driving using an advanced driver assistance system or the like, improving the result of calibration. Furthermore, in an environment in which calibration is impossible, it is possible to acquire an optimized calibration result from the outside and to apply the same.

However, the effects achievable through the present invention are not limited to the above-mentioned effects, and other effects not mentioned herein will be clearly understood by those skilled in the art from the above description.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicular surrounding image calibration method comprising:
   receiving, by a surround view monitor (SVM) controller, a signal indicating a driving state suitable for calibration condition from an advanced driver assistance system (ADAS) controller;
   acquiring, by the SVM controller, luminance information and weather information through a connected car service (CCS);
   acquiring, by the SVM controller, road attributes and a vehicle speed from an audio video navigation (AVN) terminal;
   performing, by the SVM controller, an automatic calibration of a surround view monitor (SVM) function or a server-based calibration of the SVM function based on a calibration value stored in a CCS server according to the acquired information; and
   controlling, by the SVM controller, a vehicle based on the automatic calibration of the SVM function or the server-based calibration of the SVM function.

2. The vehicular surrounding image calibration method of claim 1, further including: comparing, by the SVM controller, a quality of current top-view image of the SVM function and a predetermined reference quality.

3. The vehicular surrounding image calibration method of claim 1, wherein the road attributes includes a condition of a road grade, an existence of construction section in a driving road, and a condition of a curvature of a predetermined section ahead in the driving road.

4. The vehicular surrounding image calibration method of claim 1, wherein the driving state includes at least one of a smart cruise control (SCC) function, a lane following assist (LFA) or lane keeping assist (LKA) function.

5. The vehicular surrounding image calibration method of claim 1, further including:
   comparing, by the SVM controller, a quality of a first top-view image obtained using a first calibration value by the automatic calibration with a quality of a second top-view image obtained using a previously applied second calibration value; and
   applying, by the SVM controller, the first calibration value, which is used for obtaining the first top-view image.

6. The vehicular surrounding image calibration method of claim 5, further including:
   transmitting, by the SVM controller, the first calibration value to an external server.

7. The vehicular surrounding image calibration method of claim 6, wherein the transmitting the first calibration value to the external server includes:
   transmitting, by the SVM controller, at least one of information on a location at which the automatic calibration is performed or information on the quality of the first top-view image to the external server.

8. A non-transitory computer-readable recoding medium storing a program configured to perform the vehicular surrounding image calibration method of claim 1.

9. A vehicle comprising:
   a first controller configured to provide a control function for lane keeping and maintaining vehicle speed of the vehicle;
   a second controller configured to provide a communication function for a connected car service (CCS) and a navigation function; and
   a third controller electrically connected to the first controller and the second controller and configured to receive a signal indicating a driving state suitable for calibration condition from the first controller, acquire luminance information and weather information from the second controller, acquire road attributes and a vehicle speed from the second controller, perform automatic calibration of a surround view monitor (SVM) function, or a server-based calibration of the SVM function based on a calibration value stored in a CCS server according to the acquired information, and control the vehicle based on the automatic calibration of the SVM function or the server-based calibration of the SVM function.

10. The vehicle of claim 9, wherein the road attributes include a condition of a road grade, an existence of a construction section in a driving road, and a condition of a curvature of a predetermined section ahead in the driving road.

11. The vehicle of claim 9, wherein the driving state includes at least one of a smart cruise control (SCC) function, a lane following assist (LFA) or lane keeping assist (LKA) function.

12. The vehicle of claim 9, wherein the third controller is configured to compare a quality of a first top-view image obtained using a first calibration value by the automatic calibration with a quality of a second top-view image obtained using a previously applied second calibration value, and configured to apply the first calibration value, which is used for obtaining the first top-view image.

13. The vehicle of claim 12, wherein the second controller transmits the first calibration value to an external server.

14. The vehicle of claim 13, wherein the second controller transmits at least one of information on a location at which the automatic calibration is performed or information on the quality of the first top-view image to the external server together with the first calibration value.

* * * * *